United States Patent
Kris et al.

(10) Patent No.: US 6,343,861 B1
(45) Date of Patent: Feb. 5, 2002

(54) MYOPIA LENS

(75) Inventors: Dimitrios Jack Kris, South Autralia; Simon John Edwards, South Australia; Scott Warren Fisher, South Australia; Simon John Pavy, South Australia; Saulius Raymond Varnas, South Australia, all of (AU)

(73) Assignee: Sola International Holdings, Ltd., Lonsdale (AU)

( * ) Notice: Subject to any disclaimer, the term of this patent is extended or adjusted under 35 U.S.C. 154(b) by 0 days.

(21) Appl. No.: 09/509,793

(22) PCT Filed: Apr. 26, 1996

(86) PCT No.: PCT/AU99/00305

§ 371 Date: Feb. 26, 2001

§ 102(e) Date: Feb. 26, 2001

(87) PCT Pub. No.: WO99/66366

PCT Pub. Date: Dec. 23, 1999

(30) Foreign Application Priority Data

Jun. 12, 1998 (AU) .............................................. PP 4063

(51) Int. Cl.$^7$ ................................................... G02C 7/06
(52) U.S. Cl. ..................................... 351/169; 351/177
(58) Field of Search ................................. 351/168, 169, 351/170, 171, 172, 177

(56) References Cited

FOREIGN PATENT DOCUMENTS

| WO | WO95/27229 | 10/1995 |
| WO | WO97/38343 | 10/1997 |

*Primary Examiner*—Scott J. Sugarman
(74) *Attorney, Agent, or Firm*—Burns Doane Swecker & Mathis, L.L.P.

(57) ABSTRACT

A progressive ophthalmic lens element including a lens surface having an upper viewing zone having a surface to achieve a refracting power corresponding to distance vision, a lower viewing zone having a greater surface power than the upper viewing zone to achieve a refracting power corresponding to near vision, and an intermediate zon extending across the lens element having a surface power varying from that of the upper viewing zone to that of the lower viewing zone and including a corridor of relatively low surface astigmatism, the progressive ophthalmic lens element including progressive design elements selected to reduce myopia progression.

23 Claims, 2 Drawing Sheets

MYOPIA LENS

The present invention relates to a progressive ophthalmic lens and in particular to a progressive ophthalmic lens designed to reduce the rate of juvenile myopia progression, and to a process for producing such lenses.

Myopia, or short-sightedness, is a condition of the eye in which parallel rays of light come to a focus in front of the retina. The condition is generally corrected utilising a diverging lens. In many countries, particularly those in the Asian region, the rate of myopia progression is significant, particularly in children, with a rate between −1.25 Dioptre (D)/yr to −2.00 D/yr. This results in a very high proportion of the population with high levels of myopia. Many countries have accordingly embarked on research programs to determine suitable methods of reducing the rate of myopia progression, but with limited success.

Numerous progressive lenses are known in the prior art. Progressive lenses have heretofore been designed on the basis that they have distance, near and intermediate viewing zones. The intermediate zone joins the near and distance zones in a cosmetically acceptable way, in the sense that no discontinuities in the lens should be visible to people observing the lens of the wearer. The design of the intermediate zone is based on a line called the "eye path" along which the optical power of the lens increases more or less uniformly. However, progressive lens designs, whilst in certain cases tailored for wearers suffering from myopia (see International Patent Application PCT/EP97/00105 to Applicants) have heretofore not been applied to juvenile wearers, nor to the problem of juvenile myopia progression.

Accordingly, it would be a significant advance in the art if the progressive lens could more closely relate to the requirements of the individual juvenile wearer. It would be a further significant advance if the lens could be so designed to encourage acceptance by juvenile wearers. For example, it would be a significant advance if the corridor could be tailored to a juvenile wearer and the overall lens design could be optimised for mounting in a relatively small frame.

Accordingly, it is an object of the present invention to overcome, or at least alleviate, one or more of the difficulties and deficiencies related to the prior art. These and other objects and features of the present invention will be clear from the following disclosure.

Accordingly, in a first aspect of the present invention, there is provided a progressive ophthalmic lens element including a lens surface having an upper viewing zone having a surface to achieve a refracting power corresponding to distance vision, a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism, the progressive ophthalmic lens element including progressive design elements selected to reduce myopia progression.

By the term "progressive design elements", we mean a combination of surface properties of a progressive lens element including, but not limited to, corridor length, width of upper viewing zone and width of lower viewing zone.

The progressive ophthalmic lens element may be specifically designed for juvenile use. Accordingly, the upper or distance viewing zone of the progressive ophthalmic lens element may be designed to be used at relatively low plus and minus prescription powers. Base curve in the range of 0.50 D to 4.00 D may be used.

Accordingly, in a preferred aspect of the present invention, there is provided a progressive ophthalmic lens element including a lens surface having an upper viewing zone having a relatively low surface power to achieve a refracting power corresponding to distance vision;

a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism, the length of the corridor being selected to encourage use by the wearer.

By the term "low to medium addition powers", we mean addition powers up to approximately 2.50 D.

By the term "corridor", we mean an area of the intermediate zone of varying power bounded by nasal and temporal contours of tolerable aberration for foveal vision.

The corridor has a "corridor length" (L), which corresponds to the length of the segment of the visual fixation locus which extends from the vertical height of the fitting cross (FC) to the vertical height of the near zone measurement point. For example, in a typical lens element according to the present invention, the power progression begins at the fitting cross (FC) height.

By the term "width of upper viewing zone" ($W_U$), we mean a horizontal dimension on the lens surface bounded by nasal and temporal isoastigmatism contours of a particular value, for example 0.50 D, at a predetermined y value, for example y=7 mm.

By the term "width of lower (near) viewing zone" ($W_L$), we mean a horizontal dimension on the lens surface bounded by nasal and temporal isoastigmatism contours of a particular value, for example 1.00 D, at a predetermined y value, for example y=−9 mm.

By the term "lens element", we mean all forms of individual refractive optical bodies employed in the ophthalmic arts, including, but not limited to, lenses, lens wafers and semi-finished lens blanks requiring further finishing to a particular patient's prescription. Also included are formers used in the manufacture of progressive glass lenses and moulds for the casting of progressive lenses in polymeric material such as the material sold under the trade designation CR39.

By the term "astigmatism or surface astigmatism", we mean a measure of the degree to which the curvature of the lens varies among intersecting planes which are normal to the surface of the lens at a point on the surface.

The lower or near viewing zone of the progressive ophthalmic lens element may exhibit a low to medium range of addition powers for example between 1.25 D and 2.50 D, preferably between 1.50 D and 2.25 D.

The intermediate zone may exhibit a relatively short corridor length for example of approximately 15 mm or less, preferably approximately 14 mm or less, more preferably approximately 10 to 14 mm. It has been established a short corridor length reduces the amount of downward gaze, thereby increasing the likelihood of children utilising the required addition power for near tasks.

The progressive lens element according to the present invention may include a relatively wide upper viewing zone. The width of the distance viewing zone, measured from the temporal 0.50 D astigmatism contour to the nasal 0.50 D astigmatism contour, should preferably be not less than 34 mm at the vertical height of 7 mm above the geometric lens centre for addition powers of up to 2.00 D.

Preferably, the width of the upper viewing zone, measured from the temporal 0.50 D astigmatism contour to the nasal 0.50 D astigmatism contour is not less than approximately 25 mm at the vertical height of 7 mm above the geometric lens centre for addition powers of above approximately 2.00 D.

The distance boundary may rise slightly towards the periphery of the lens element. This does not cause a difficulty as the relatively small size of the finished juvenile lens means that this region is removed in practice. It will be understood that this design provides an increased ability to reduce peripheral astigmatism in the lower portion of the lens.

The distribution of astigmatism in the lower portion of the lens may accordingly be relatively soft.

For example, the width of the near viewing zone, measured from the temporal 1.00 D astigmatic contour to the nasal 1.00 D astigmatic contour should preferably be not less than 14 mm at the vertical height of −9 mm from the geometric lens centre for lenses having addition powers up to approximately 1.50 D.

Preferably, the width of the near viewing zone measured from the temporal 1.00 D astigmatism contour to the nasal 1.00 D astigmatism contour is not less than approximately 10 mm at the vertical height of −9 mm from the geometric lens; centre for lenses having addition powers above 1.50 D.

As stated above, the optical lens element further includes a relatively wide upper viewing zone with relatively low surface astigmatism. At high addition powers the upper viewing zone may exhibit slightly increased surface astigmatism.

It will be understood the progressive ophthalmic lens element according to the present invention may form part of a series of ophthalmic lens elements.

Accordingly, in a preferred aspect of the present invention, there is provided a series of progressive ophthalmic lens elements, each lens element including a lens surface having an upper viewing zone having a relatively low surface power to achieve a refracting power corresponding to distance vision;

a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism, the length of the corridor being selected to encourage use by the wearer.

Preferably, the progressive ophthalmic lens element series includes a set of lens elements, each lens having a single base curve, each lens within the set differing in prescribed addition power and including a progressive design, the width of the upper viewing zone measured from the temporal 0.50 D astigmatism contour to the nasal 0.50 D astigmatism contour being not less than approximately 34 mm at the vertical height of 7 mm above the geometric lens centre for lenses having addition powers of up to approximately 2.00 D; the periphery of the upper viewing zone exhibiting slightly increased surface astigmatism at higher addition powers:

the width of the lower viewing zone, measured from the temporal 1.00 D astigmatism contour to the nasal 1.00 D astigmatism contour being not less than 14 mm at the vertical height of −9 mm from the geometric lens centre for addition powers of up to approximately 1.50 D, the width of the lower viewing zone narrowing slightly at addition powers above 1.50 D, the intermediate zone exhibiting a corridor length of approximately 15 mm or less.

It will be understood a purpose of the progressive lens element according to this aspect of the present invention is to provide a means for the treatment of myopia progression. Accordingly in a further aspect of the present invention, there is provided a method for the retardation of myopic progression after onset, in particular juvenile myopia progression.

This method includes providing to a patient spectacles bearing a pair of progressive ophthalmic lens elements, each lens element including a lens surface having an upper viewing zone having a relatively low surface power to achieve a refracting power corresponding to distance vision;

a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism, the length of the corridor being selected to encourage use by the wearer.

Applicants consider that by utilising the method according to the present invention, the rate of myopia progression may be significantly reduced, for example by up to one half.

Preferably, the lower or near viewing zone of the progressive ophthalmic lens element may exhibit a low to medium range of addition powers for example between 1.25 D and 2.50 D, preferably between 1.50 D and 2.25 D.

The intermediate zone may exhibit a relatively short corridor length, preferably 14 mm or less as stated above. It has been established a short corridor length reduces the amount of downward gaze, thereby increasing the likelihood of children utilising the required addition power for near tasks.

The ophthalmic lens element may be formulated from any suitable material. A polymeric material may be used. The polymeric material may be of any suitable type. The polymeric material may include a thermoplastic or thermoset material. A material of the diallyl glycol carbonate type, for example CR-39 (PPG Industries) may be used.

The polymeric article may be formed from cross-linkable polymeric casting compositions, for example as described in Applicants' U.S. Pat. No. 4,912,155, U.S. patent application Ser. No. 07/781,392, Australian Patent Applications 50581/93, 50582/93, 81216/87, 74160/91 and European Patent Specification 453159A2, the entire disclosures of which are incorporated herein by reference.

The polymeric material may include a dye, preferably a photochromic dye, which may, for example, be added to the monomer formulation used to produce the polymeric material.

The ophthalmic lens element according to the present invention may further include standard additional coatings to the front or back surface, including electrochromic coatings.

The front lens surface may include an anti-reflective (AR) coating, for example of the type described in U.S. Pat. No. 5,704,692 to Applicants, the entire disclosure of which is incorporated herein by reference.

The front lens surface may include an abrasion resistant coating. e.g. of the type described in U.S. Pat. No. 4,954,591 to Applicants, the entire disclosure of which is incorporated herein by reference.

The front and back surfaces may further include one or more additions conventionally used in casting compositions such as inhibitors, dyes including thermochromic and photochromic dyes, e.g. as described above, polarising agents, UV stabilisers and materials capable of modifying refractive index.

The present invention will now be more fully described with reference to the accompanying figures and examples. It should be understood, however, that the description following is illustrative only and should not be taken in any way as a restriction on the generality of the invention described above.

Figure 1:
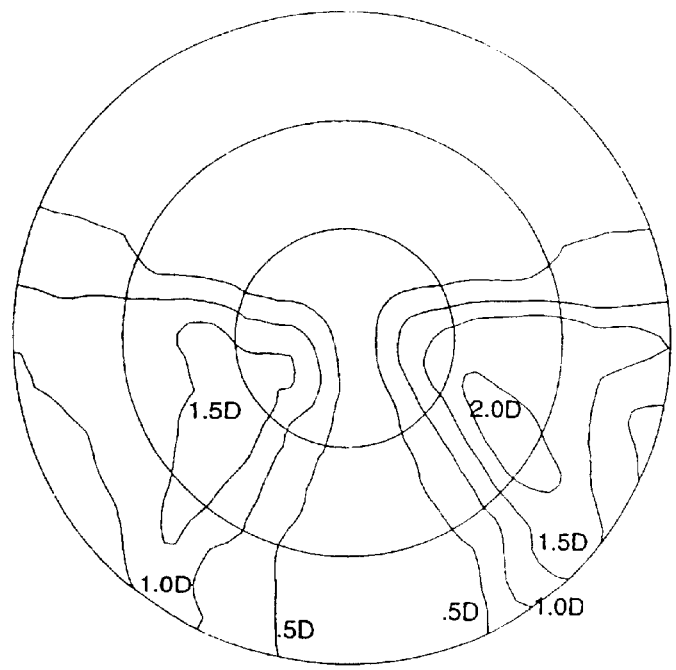
FIG. 1 illustrates a contour plot of surface astigmatism of an optical lens element according to the present invention which has a 3.50 D base curve and 1.50 D add.
Figure 2:
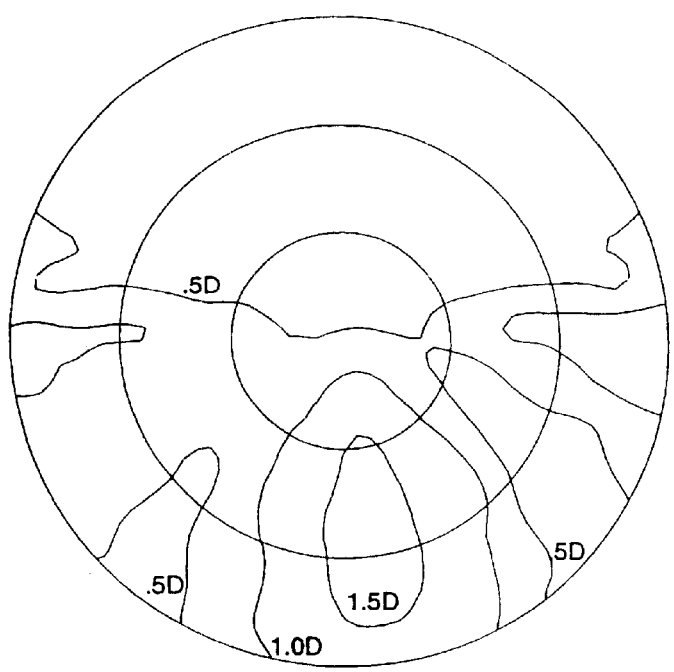
FIG. 2 illustrates a contour plot of mean surface power of the optical lens element of FIG. 1.
Figure 3:
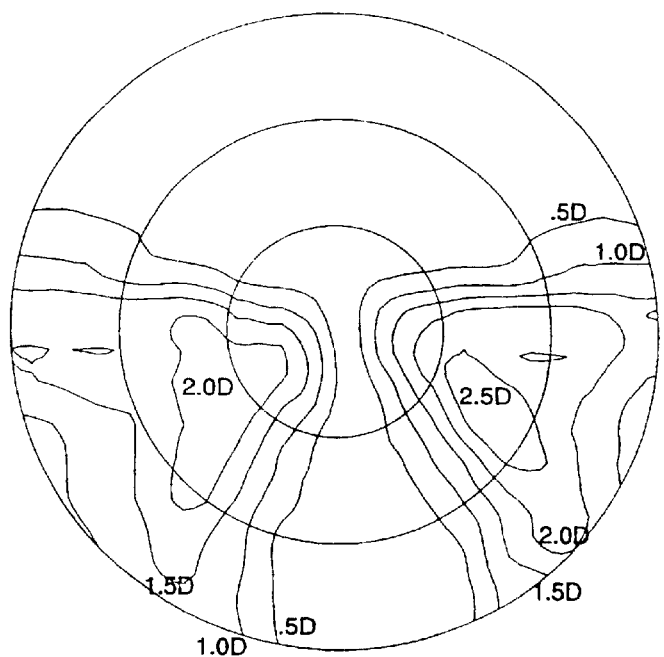
FIG. 3 illustrates a contour plot of surface astigmatism of an optical lens element according to the present invention which has a 3.50 D base curve and 2.00 D add.
Figure 4:
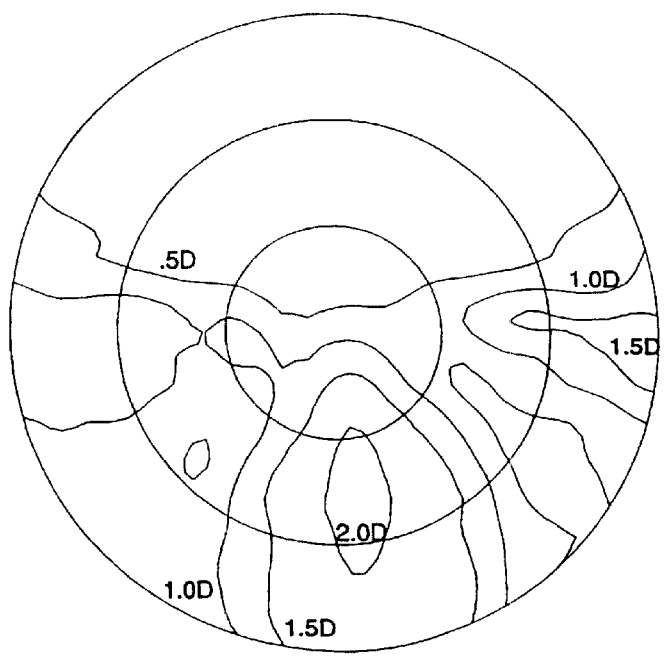
FIG. 4 illustrates a contour plot of mean surface power of the optical lens element of FIG. 3.

In FIGS. 1 to 4, the circles are at 10 mm intervals.

EXAMPLE 1

An optical lens element according to the present invention was designed having a 3.50 D base curve and exhibiting 1.50 D addition power in the lower or near viewing zone. The contour plots of surface astigmatism and mean surface power respectively for the optical lens are given in FIGS. 1 and 2. The design provides a relatively wide upper or distance viewing zone with the 0.5 D astigmatic contour rising towards the periphery. The design exhibits a relatively short corridor length leading to a relatively wide lower or near viewing zone.

The circles on the contour plots are at 10 mm intervals. Accordingly it will be noted that relatively hard surface astigmatism distortions and mean power errors occur substantially only beyond x≈20 to 25 mm, that is where they will be substantially removed after edging for a juvenile patient.

EXAMPLE 2

An optical lens element similar to that in Example 1 was designed having a 3.50 D base curve and exhibiting 2.00 D addition power in the lower or near viewing zone. The contour plots of surface astigmatism and mean surface power respectively for the optical lens are given in FIGS. 3 and 4. The design again provides a relatively clear and wide upper viewing zone and short corridor length.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

What is claimed is:

1. A progressive ophthalmic lens element including a lens surface having an upper viewing zone having a relatively low surface power to achieve a refracting power corresponding to distance vision, a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism, the element including progressive design elements selected to reduce myopia progression; wherein the lens element is designed for juvenile use and exhibits a base curve in the range of 0.50 to 4.00 D.

2. A progressive ophthalmic lens element including progressive design elements selected to reduce myopia progression, the lens surface having an upper viewing zone having a relatively low surface power to achieve a refracting power corresponding to distance vision:

a lower viewing zone having a greater surface power than the upper viewing zone to achieve a refracting power corresponding to near vision; and an intermediate zone extending across the lens element having a surface power varying from that of the upper viewing zone to that of the lower viewing zone and including a relatively short corridor of relatively low surface astigmatism;

wherein the element is designed for juvenile use and exhibits a base curve in the range of 0.50 to 4.00 D, the length of the corridor being selected to encourage a by the wearer of required addition power for near vision tasks.

3. An ophthalmic lens element according to claim 2, wherein the corridor length is approximately 15 mm or less.

4. An ophthalmic lens element according to claim 3, wherein the corridor length is approximately 10 mm to 14 mm.

5. An ophthalmic lens element according to claim 2, wherein the lower viewing zone exhibits an addition power in the low to medium range.

6. An ophthalmic lens element according to claim 5, wherein the lower viewing zone exhibits an addition power in the range of from approximately 1.25 D to 2.50 D.

7. An ophthalmic lens element according to claim 2 wherein the lens element exhibits a relatively wide upper viewing zone with relatively low surface astigmatism at low to medium addition powers.

8. An ophthalmic lens element according to claim 7 wherein the lens element exhibits slightly increased surface astigmatism at high addition powers.

9. An ophthalmic lens element according to claim 8, wherein the width of the upper viewing zone, measured from the temporal 0.50 D astigmatism contour to the nasal 0.50 D astigmatism contour is not less than approximately 34 mm at the vertical height of 7 mm above the geometric lens centre for lenses having addition powers of up to approximately 2.00 D.

10. An ophthalmic lens element according to claim 9, wherein the width of the upper viewing zone, measured from the temporal 0.50 D astigmatism contour to the nasal 0.50 D astigmatism contour is not less than approximately 25 mm at the vertical height of 7 mm above the geometric lens centre for addition powers of above approximately 2.00 D.

11. An ophthalmic lens element according to claim 2, wherein the distance boundary rises towards the periphery of the lens element.

12. An ophthalmic lens element according to claim 2, wherein the width of the near viewing zone measured from the temporal 1.00 D astigmatism contour to the nasal 1.00 D astigmatism contour is not less than approximately 14 mm at the vertical height of −9 mm from the geometric lens centre for lenses having addition powers up to approximately 1.50 D.

13. An ophthalmic lens element according to claim 2, wherein the width of the near viewing zone measured from the temporal 1.00 D astigmatism contour to the nasal 1.00 D astigmatism contour is not less than approximately 10 mm at the vertical height of −9 mm from the geometric lens centre for lenses having addition powers above 1.50 D.

14. A progressive ophthalmic lens element including progressive design elements selected to reduce myopia progression, including a lens surface having an upper viewing zone having a relatively low surface power to achieve a refracting power corresponding to distance vision;

a lower viewing zone having a greater surface power than the upper viewing zone to achieve a refracting power corresponding to near vision; and an intermediate zone extending across the lens element having a surface power varying from that of the upper viewing zone to that of the lower viewing zone and including a relatively short corridor of relatively low surface astigmatism;

wherein the lens element is designed for juvenile use and exhibits a base curve in the range of 0.50 to 4.00 D, the length of the corridor being selected to encourage use by the wearer of required addition power for near tasks; and a relatively wide upper viewing zone with relatively low surface astigmatism at low to medium addition powers the distance boundary rises slightly towards the periphery of the lens element and the lower portion of the lens element exhibits a slightly reduced peripheral astigmatism.

15. An ophthalmic lens element according to claim 14, wherein the corridor length is approximately 15 mm or less.

16. A method for the retardation of myopia progression, which method includes providing to a patient spectacles bearing a pair of progressive ophthalmic lens elements, each lens element including a lens surface having an upper viewing zone having a relatively low surface power to achieve a refracting power corresponding to distance vision;

a lower viewing zone having a greater surface power than the upper viewing zone to achieve a refracting power corresponding to near vision: and an intermediate zone extending across the lens element having a surface power varying from that of the upper viewing zone to that of the lower viewing zone and including a relatively short corridor of relatively low surface astigmatism, wherein the element is designed for juvenile use and exhibits a base curve in the range of 0.50 to 4.00 D, the length of the corridor being selected to encourage use by the wearer of required addition power for near vision tasks.

17. A method according to claim 16, wherein the myopic onset is related to juvenile myopia progression.

18. A method according to claim 17, wherein the rate of juvenile myopia progression is significantly reduced.

19. A method according to claim 16, wherein each lens element exhibits a relatively wide upper viewing zone with relatively low surface astigmatism at low to medium addition powers the distance boundary rises slightly towards the periphery of the lens element and the lower portion of the lens exhibits a slightly reduced peripheral astigmatism.

20. A method according to claim 19, wherein each lens element exhibits a corridor length of approximately 15 mm or less.

21. A series of progressive ophthalmic lens elements, each lens element including progressive lens elements selected to reduce myopia progression including a lens surface having an upper viewing zone having a relatively low surface power to achieve a refracting power corresponding to distance vision;

a lower viewing zone having a greater surface power than the upper viewing zone to achieve a refracting power corresponding to near vision; and an intermediate zone extending across the lens element having a surface power varying from that of the upper viewing zone to that of the lower viewing zone and including a relatively short corridor of relatively low surface astigmatism, wherein each element is designed for juvenile use and exhibits a base curve in the range of 0.50 to 4.00 D;

the length of the corridor being selected to encourage use by the wearer of required addition power for near vision tasks.

22. A progressive ophthalmic lens element series according to claim 21, including a set of lens elements, each lens having a single base curve, each lens within the set differing in prescribed addition power and including a progressive design, the width of the upper viewing zone measured from the temporal 0.50 D astigmatism contour to the nasal 0.50 D astigmatism contour being not less than approximately 34 mm at the vertical height of 7 mm above the geometric lens centre for lenses having addition powers of up to approximately 2.00 D;

the periphery of the upper viewing zone exhibiting slightly increased surface astigmatism at higher addition powers;

the width of the lower viewing zone, measured from the temporal 1.00 D astigmatism contour to the nasal 1.00 D astigmatism contour being not less than 14 mm at the vertical height of −9 mm from the geometric lens centre for addition powers of up to 1.50 D, the width of the lower viewing zone narrowing slightly at addition powers above 1.50 D, the intermediate zone exhibiting a corridor length of approximately 15 mm or less.

23. A progressive ophthalmic lens element series according to claim 21 wherein each lens element exhibits a corridor length of approximately 10 mm to 14 mm.

* * * * *

UNITED STATES PATENT AND TRADEMARK OFFICE
CERTIFICATE OF CORRECTION

PATENT NO. : 6,343,861 B1
DATED : February 5, 2002
INVENTOR(S) : Dimitrios Jack Kris et al.

It is certified that error appears in the above-identified patent and that said Letters Patent is hereby corrected as shown below:

<u>Title page,</u>
Item [22], PCT Filing Date, should read -- April 26, 1999 --, not "April 26, 1996".

Signed and Sealed this

Ninth Day of August, 2005

JON W. DUDAS
*Director of the United States Patent and Trademark Office*